(12) United States Patent
Kouno et al.

(10) Patent No.: US 9,138,951 B2
(45) Date of Patent: Sep. 22, 2015

(54) TIRE AND TIRE MANUFACTURING METHOD

(75) Inventors: Yoshihide Kouno, Kodaira (JP); Seiji Kon, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 7 days.

(21) Appl. No.: 13/201,761

(22) PCT Filed: Feb. 17, 2010

(86) PCT No.: PCT/JP2010/052361
§ 371 (c)(1),
(2), (4) Date: Aug. 16, 2011

(87) PCT Pub. No.: WO2010/095655
PCT Pub. Date: Aug. 26, 2010

(65) Prior Publication Data
US 2011/0297290 A1 Dec. 8, 2011

(30) Foreign Application Priority Data
Feb. 17, 2009 (JP) ................. 2009-034226

(51) Int. Cl.
*B60C 5/01* (2006.01)
*B60C 5/18* (2006.01)
*B60C 9/14* (2006.01)
*B60C 9/22* (2006.01)
(Continued)

(52) U.S. Cl.
CPC ............ *B29D 30/1628* (2013.01); *B29D 30/08* (2013.01); *B29D 30/1607* (2013.01);
(Continued)

(58) Field of Classification Search
CPC ............ B60C 5/007; B60C 5/01; B60C 5/18; B60C 9/22; B60C 2009/2209; B29D 30/0678; B29D 30/0679; B29D 30/08; B29D 2030/084; B29D 2030/086

USPC ................ 152/452, 343.1, 344.1, 345.1, 453, 152/340.1, 543; 156/125, 110.1, 117, 242, 156/245, 304.2
See application file for complete search history.

(56) References Cited

U.S. PATENT DOCUMENTS 3,607,570 A 9/1971 Hildebrandt et al.
3,888,291 A 6/1975 Herzlich et al.
(Continued)

FOREIGN PATENT DOCUMENTS

EP 0 006 425 A1 * 1/1980
FR 2 429 111 A * 2/1980
(Continued)

OTHER PUBLICATIONS

Extended European Search Report, dated Mar. 18, 2013, issued in corresponding European Application No. 10743781.6.
(Continued)

*Primary Examiner* — Adrienne C Johnstone
(74) *Attorney, Agent, or Firm* — Sughrue Mion, PLLC

(57) ABSTRACT

A tire configured from joining together plural tire frame members formed from a thermoplastic material in which sufficient strength of the joint portion is secured. Two tire halves 17A formed from a first thermoplastic material are supported by a tire supporting section 40 so as to be aligned with each other and abutting, while rotating this configuration melted welding thermoplastic material 43 is extruded from a nozzle 46 towards the joining location, and the welding thermoplastic material 43 is pressed by a flattening roller 48. The one tire half 17A and the other tire half 17A are thereby welded together with the welding thermoplastic material 43.

7 Claims, 15 Drawing Sheets

(51) Int. Cl.
*B29D 30/08* (2006.01)
*B60C 15/06* (2006.01)
*B29D 30/16* (2006.01)
*B60C 5/00* (2006.01)
*B29D 30/28* (2006.01)
*B29D 30/38* (2006.01)
*B29D 30/58* (2006.01)
*B60C 3/02* (2006.01)
*B60C 5/22* (2006.01)
*B29D 30/30* (2006.01)
*B29D 30/52* (2006.01)

(52) U.S. Cl.
CPC ............... *B29D30/28* (2013.01); *B29D 30/38* (2013.01); *B29D 30/58* (2013.01); *B60C 5/007* (2013.01); *B60C 5/01* (2013.01); *B60C 5/18* (2013.01); *B60C 9/14* (2013.01); *B60C 9/22* (2013.01); *B60C 9/2204* (2013.04); *B29D 2030/086* (2013.01); *B29D 2030/3078* (2013.01); *B29D 2030/383* (2013.01); *B29D 2030/523* (2013.01); *B60C 3/02* (2013.01); *B60C 5/22* (2013.01); *B60C 2009/2209* (2013.04); *B60C 2015/0614* (2013.04); *Y10T 152/10495* (2015.01); *Y10T 152/10594* (2015.01); *Y10T 152/10819* (2015.01); *Y10T 152/10828* (2015.01)

(56) References Cited

U.S. PATENT DOCUMENTS

| | | | |
|---|---|---|---|
| 4,201,744 | A | 5/1980 | Makinson |
| 4,315,536 | A | 2/1982 | Knipp et al. |
| 5,015,315 | A | 5/1991 | Nakasaki |
| 5,032,198 | A * | 7/1991 | Kojima et al. ............ 156/117 |
| 5,204,407 | A | 4/1993 | Araki et al. |

FOREIGN PATENT DOCUMENTS

| | | | |
|---|---|---|---|
| JP | S51136761 A | 11/1976 | |
| JP | S5416307 A | 2/1979 | |
| JP | S54162307 A | 12/1979 | |
| JP | 55-11894 A | 1/1980 | |
| JP | 3-143701 A | 6/1991 | |
| JP | 3-148302 A | 6/1991 | |
| JP | H03164302 A | 7/1991 | |
| JP | H0616008 A | 1/1994 | |
| JP | 2000-158907 A | 6/2000 | |
| JP | 3320420 B2 | 9/2002 | |
| JP | 2005-343380 A | 12/2005 | |
| JP | 2007-160844 A | 6/2007 | |

OTHER PUBLICATIONS

International Search Report for PCT/JP2010/052361, dated May 18, 2010.

Korean Office Action, dated Jan. 21, 2013, issued in corresponding Korean Application No. 10-2011-7021351.

Japanese Office Action dated Jan. 7, 2014, issued in corresponding Japanese Patent Application No. 2011-500632.

Japanese Office Action dated Jan. 6, 2015, issued in corresponding Japanese Patent Application No. 2014-044663.

European Office Action dated Oct. 22, 2014, issued in corresponding European Patent Application No. 10743781.6.

\* cited by examiner

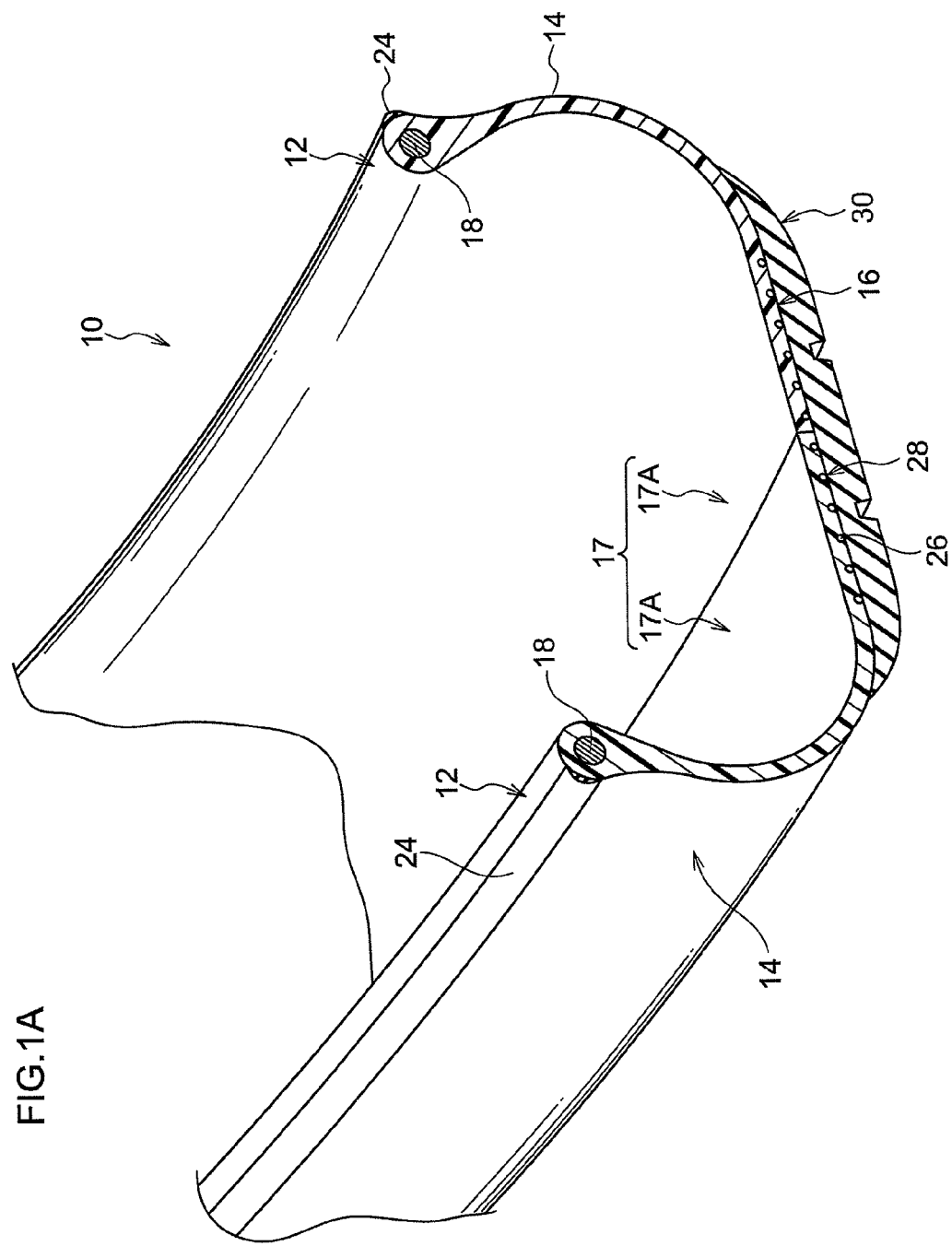

TIRE AND TIRE MANUFACTURING METHOD

CROSS REFERENCE TO RELATED APPLICATIONS

This application is a National Stage of International Application No. PCT/JP2010/052361, filed on Feb. 17, 2010, which claims priority from Japanese Patent Application No. 2009-034226, filed on Feb. 17, 2009, the contents of all of which are incorporated herein by reference in their entirety.

TECHNICAL FIELD

The present invention relates to a tire for rim mounting and tire manufacturing method, and in particular to a tire and tire manufacturing method in which at least a portion of the tire is formed from a thermoplastic material.

BACKGROUND ART

Pneumatic tires configured with rubber, organic fiber material, and steel members are traditionally employed on vehicles such as cars.
However, there is a limit to application of post-use recycling of rubber, and disposal is performed by such processes as combustion and shredding for use as pavement materials for roads.
There is a need recently to use materials such as thermoplastic resins and thermoplastic elastomers as tire materials due to their advantages from the perspectives of weight reduction, ease of formability, and ease of recycling.
For example, a pneumatic tire formed using a thermoplastic polymer material is described in Patent Document 1.
Patent Document 1: Japanese Patent Application Laid-Open No. 03-143701.

DISCLOSURE OF INVENTION

Technical Problem

Tires employing thermoplastic polymer materials are easier to manufacture and lower in cost than conventional rubber tires.
However, there is an issue that when molding a tire in a mold, when the internal hollow section of a tire is formed by a core, the core cannot be removed from the tire after molding. Patent Document 1 therefore molds half-ring-shaped tire pieces split in the tire axial direction, and then obtains a pneumatic tire by joining together two of the tire pieces.
Joining the tire pieces together is achieved by heating, such as by heating a mold itself at the periphery of the joint portions of one tire piece and another tire piece, or heating with a radio-frequency heater, melting the thermoplastic polymer material configuring the tire pieces to make it flow.
However, when an already molded tire piece is reheated and melted, the joint portion is subjected to heat for a long period of time. Accordingly, sometimes the material strength of the melted and solidified portion is lower than that of other portions due to thermal degradation, leaving residual concerns regarding the strength of the joint portion.
Due to melting the periphery of the joint portion, the joint portion needs to be formed with a jointing mold, resulting in the issue of an increased number of molds.
Furthermore, in order to form a flat jointing face and to ensure symmetry there is a need to change the profile of the joint portion between one of the tire pieces and the other of the tire pieces, requiring two molds and leading to extra manufacturing costs and extra effort for mold control.
With conventional technology in which a jointing flange is provided to each of one tire piece and another tire piece, due to melting and joining the overlapping portions of the jointing flanges, in order to heat and join (weld) the joining faces together from outside, the joint portions need to be melted through their entire thickness direction, inherently resulting in a large amount of thermoplastic for melting and a long heating duration.
When the amount (volume) of resin to be melted during joining is large, post-cooling sinking (an indentation occurring due to shrinkage during solidification of the melted portion) readily occurs, resulting in reduced strength and deterioration in dimensional precision, and an increase in the portion subject to thermally degradation.
The present invention is made to address the above issues and is directed towards a tire configured from joined plural tire frame members formed from a thermoplastic material, in which the tire frame members are only subjected to a small amount of heat, stress concentration due to deformation is suppressed, and sufficient strength of the joint portion is secured.

Solution to Problem

A first aspect of the present invention is a tire configured with plural tire frame members formed from a thermoplastic material, wherein mutually adjacent ones of the tire frame members are joined by employing a thermoplastic material body separate from the tire frame members.
Explanation follows regarding operation of a tire according to the first aspect. Making a tire for mounting to a rim from thermoplastic material a molded product would normally cause difficulties in removing the core portion for forming the tire internal surface portion after forming the tire in a mold. However, the tire is split in to plural sections along the axial direction, and sectioned tire frame members can each be formed without employing a core.
In the tire according to the first aspect, mutually adjacent tire frame members are joined by employing a thermoplastic material body separate from the tire frame members. Since joining is not accomplished in the manner of a joining conventional tire, in which heat is applied over a wide region of the joint portion of the tire frame members formed from thermoplastic material and only the thermoplastic material configuring the tire frame member is melted, the tire frame members are only subjected to a small amount of heat and deterioration in the strength of the thermoplastic material at the joint portion is suppressed, enabling the strength of the joint portion to be secured.
Furthermore, in a tire according to the first aspect, even suppose sinking was to occur at the joint portion of the tire frame members due to solidification of the melted thermoplastic material, since thermoplastic material of a separate body to the tire frame members is supplied when joining, sinking is effectively suppressed from occurring due to supplying the thermoplastic material to the sunken portion, suppressing the formation of indentations, and suppressing deterioration of dimensional precision and uneven stress concentration.
A second aspect of the present invention is the tire according to the first aspect, further including a bead section that, at the tire radial direction inside, makes contact with a bead seat and a rim flange on a rim, wherein a ring shaped bead core formed from a metal material is embedded in the bead section.

Explanation follows regarding operation of a tire according to the second aspect. By embedding the ring shaped bead core formed from a metal member in the bead section that is the location for fitting to a rim, similar robustness of the tire to the rim as that of a conventional rubber pneumatic tire can be maintained.

A third aspect of the present invention is the tire of the first aspect or the second aspect, wherein the thermoplastic material configures the tire from a side section to an outer peripheral section.

Explanation follows regarding operation of a tire according to the third aspect. A thermoplastic material configures the tire from a side section to an outer peripheral section, namely a large proportion of the whole tire is thermoplastic material due to the thermoplastic material configuring the tire from a one side section across to the other side section, improving the recyclability. Reference to the outer peripheral section indicates the portion connecting between the tire radial direction outside edge of one of the side sections and the tire radial direction outside edge of the other side section.

A fourth aspect of the present invention is the tire according to one of the first to the third aspects, further including a reinforcement layer formed with a spirally wound cord of higher rigidity than that of the thermoplastic material configuring the tire frame members, at least partly embedded in an outer peripheral section of the tire.

Explanation follows regarding operation of a tire according to the fourth aspect. By providing the reinforcement layer formed with a spirally wound cord of higher rigidity than that of the thermoplastic material configuring the tire frame members in the tire outer peripheral section the side of the tire that makes contact with the road is reinforced. The reinforcement layer serves the role equivalent to that of a belt in a rubber pneumatic tire. Accordingly, by providing the reinforcement layer in the outer peripheral section of the tire, the resistance to punctures, damage resistance, circumferential direction rigidity and cleaving prevention effect is improved compared to when no reinforcement layer is provided. Furthermore, at least a portion of the reinforcement layer is buried in the tire outer peripheral section including the joint portion, so the rigidity to air pressure acting from the radial direction inside is raised, lifting the strength to internal pressure.

A fifth aspect of the present invention is the tire according to one of the first to the fourth aspects further including a seal portion provided at a portion making rim contact and formed from a material that is softer than the thermoplastic material configuring the tire frame members such that air inside the tire does not leak outside.

Explanation follows regarding operation of a tire according to the fifth aspect. By providing the seal portion at a portion making rim contact formed from a material that is softer than the thermoplastic material configuring the tire frame members, the sealing ability between the tire and the rim is raised. Air inside the tire can accordingly be further suppressed from leaking out compared to a configuration in which a seal is formed between the rim and the thermoplastic material. The rim fitting characteristics can also be raised by providing the seal portion.

A sixth aspect of the present invention is the tire according to one of the first to the fifth aspects further including a tread rubber layer provided at a portion making road surface contact, wherein the tread rubber layer is formed from rubber with superior abrasion resistance compared with than the thermoplastic material configuring the tire frame members.

Explanation follows regarding operation of a tire according to the sixth aspect. By providing the tread rubber layer at a portion making road surface contact formed from rubber with superior abrasion resistance properties than the thermoplastic material configuring the tire frame members, the resistance to abrasion and resistance to damage, for example, can be raised in comparison to a configuration in which rubber is not provided to the portion making road surface contact.

A seventh aspect of the present invention is the tire according to one of the first to the sixth aspects wherein mutually adjacent joining faces of one of the tire frame members and another of the tire frame members slope such that a separation between the joining faces widens on progression towards the tire outside, and at least the joining faces are joined together by employing a thermoplastic material body separate from the tire frame members.

Explanation follows regarding operation of a tire according to the seventh aspect. By sloping the joining faces such that the separation between the joining faces widens on progression towards the tire outside, the surface area (join surface area) for applying the thermoplastic material body for joining separate from the tire frame members is increased, and the joint strength can be raised. Sloping the joining faces such that the separation between the joining faces widens on progression towards the tire outside facilitates flow of molten thermoplastic material (body used for joining separate to the tire frame members) between the sloped joining faces, namely into the grooved portion formed between the two sloped joining faces, and undulations can be suppressed from occurring in the joint portion. The thickness of the outer peripheral section is accordingly flattened, improving tire performance, such as uniformity.

An eighth aspect of the present invention is the tire according to one of the first to the seventh aspects wherein one of the tire frame members and another of the tire frame members are disposed with a gap between each other and a thermoplastic material body separate from the tire frame members is interposed in the gap.

Explanation follows regarding operation of a tire according to the eighth aspect. By disposing a gap between one of the tire frame members and another of the tire frame members the surface area for applying the joining thermoplastic material body separate from the tire frame members is increased by the surface area of the faces formed by the gap, in comparison to a case in which the one tire frame member and the other tire frame member are in close contact with each other, and the joint strength can be raised An ninth aspect of the present invention is the tire according to one of the first to the seventh aspects wherein one of the tire frame members and another of the tire frame members, which are adjacent to each other are joined at a central portion in the tire width direction.

Explanation follows regarding operation of a tire according to the ninth aspect. Adopting a configuration in which the one tire frame member and the other tire frame member are joined at a central portion in the tire width direction results in aligning and joining together two tire frame members of the same shape, one mold is hence sufficient for forming the tire frame members, enabling more efficient production to be achieved than if the one tire frame member and the other tire frame member have different shapes from each other.

A tenth aspect of the present invention is the tire according to one of the first to the eighth aspects wherein the plural tire frame members include a pair of first tire frame members configuring two side sections, and a second tire frame member disposed between the pair of first tire frame members and forming a road-surface-facing outer peripheral section.

Explanation follows regarding operation of a tire according to the tenth aspect. By configuring the tire with a pair of first tire frame members configuring side sections, and a second tire frame member forming a road-surface-facing outer peripheral section the jointed locations can be placed so as not to make contact and be abraded by the road surface. The force input to the joint portion from the road surface can also be suppressed, enabling defects caused by the joint portion to be suppressed.

An eleventh aspect of the present invention is a tire manufacturing method for manufacturing a tire configured by plural joined together tire frame members disposed along a tire axial direction and formed from a thermoplastic material, the manufacturing method including processes of: joining together one of the tire frame members and another of the tire frame members by applying a melted thermoplastic material to both the one tire frame member and the other tire frame member, and letting the melted thermoplastic material applied to the one tire frame member and the other tire frame member cool and solidify.

In the tire manufacturing method according to the eleventh aspect, first one tire frame member and the other tire frame member are aligned with each other and a melted thermoplastic material is applied to both the one tire frame member and the other tire frame member. The one tire frame member and the other tire frame member are then joined together robustly by letting the thermoplastic material (body used for joining, separate to the tire frame member) that was applied in a molten state to the one tire frame member and the other tire frame member cool and solidify.

The twelfth aspect of the present invention is the tire manufacturing method according to the eleventh aspect, wherein the melted thermoplastic material is supplied sequentially along the joint portions of the one tire frame member and the other tire frame member, and the melted thermoplastic material applied to the tire frame members is sequentially pressed by a roller.

In the tire manufacturing method according to the twelfth aspect, first the melted thermoplastic material (body used for joining, separate to the tire frame member) is supplied sequentially along the joint portions of the one tire frame member and the other tire frame member. Then the melted thermoplastic material (body used for joining, separate to the tire frame member) that was applied in a molten state to the tire frame members is sequentially pressed by a roller. The thermoplastic material body used for joining, separate from the tire frame member, can accordingly be flattened out evenly and solidified.

A tire manufacturing method according to a thirteenth aspect of the present invention includes: sequentially supplying a strip shaped welding sheet formed from a thermoplastic material so as to face a joint portion between one tire frame member and another tire frame member; and softening or melting respective surfaces of a surface of a portion of the welding sheet that will contact the tire frame member and a surface of portions of the tire frame members that will contact the welding sheet, and then pressing the welding sheet against the tire frame member by successive rolling.

In the tire manufacturing method according to the thirteenth aspect, the surfaces of a surface of a portion of the welding sheet that will contact the tire frame member and a surface of portions of the tire frame members that will contact the welding sheet are respectively softened or melted and then the welding sheet is pressed against the tire frame member by successive rolling, and so the welding sheet can be welded to the tire frame members.

A fourteenth aspect of the present invention is the tire manufacturing method of the thirteenth aspects wherein the welding sheet has a width of 5 mm or greater.

In the tire manufacturing method of the fourteenth aspect, since the width of the welding sheet is 5 mm or greater sufficient joint strength can be obtained. There is no particular upper limit to the width, however preferably the width is suppressed to up to about the ground contact width of the tire since the amount of welding sheet used increases with width.

Advantageous Effects of Invention

Configuring the tire of the present invention as explained above results in the excellent effect of enabling sufficient strength to be secured at the joint portion. Furthermore, according to the tire manufacturing method of the present invention a tire with sufficient strength secured at the joint portion can be efficiently manufactured.

BRIEF DESCRIPTION OF DRAWINGS

FIG. 1A is a perspective view of a cross-section of a portion of a tire according to an exemplary embodiment of the present invention.

DESCRIPTION OF EMBODIMENTS

First Exemplary Embodiment

Explanation follows regarding a tire according to a first exemplary embodiment of the tire of the present invention, with reference to the drawings.

Figure 1B:
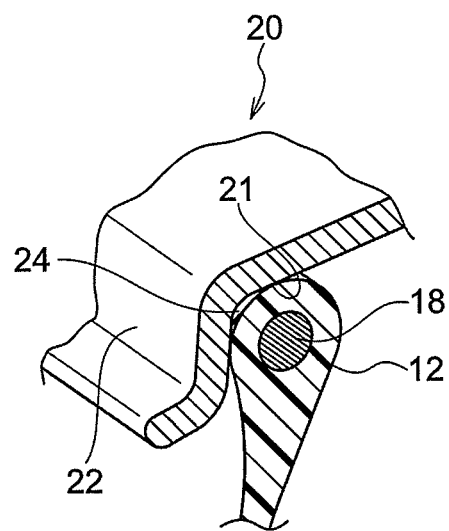
FIG. 1B is a cross-section of a bead portion mounted to a rim.

As shown in FIG. 1, a tire 10 of the present exemplary embodiment displays a substantially similar cross-section profile to that of an ordinary conventional rubber pneumatic tire.

The tire 10 is equipped with a tire case 17 configured from: a pair of bead sections 12 that make contact with a bead seat section 21 and a rim flange 22 of a rim 20; side sections 14 that extend from the bead sections 12 towards the tire radial direction outside; and a crown section 16 that connects together the tire radial direction outside edge of one of the side sections 14 and the tire radial direction outside edge of the other of the side sections 14. The tire case 17 of the present exemplary embodiment is formed from a first thermoplastic material.

The tire case 17 of the present exemplary embodiment is formed by mutually aligning circular ring shaped tire halves 17A, each formed in similar shapes to each other by integrating together, such as by molding, one of the bead sections 12, one of the side sections 14, and a half width crown section 16, and bonding together the tire halves 17A along a tire equatorial plane face portion. The tire case 17 is not limited to a tire case formed by bonding together two members, and the tire case 17 may be formed by bonding together 3 or more members, or by forming the pair of bead sections 12, the pair of side sections 14 and the crown section 16 into a single unit.

Examples of materials that can be employed as the first thermoplastic material include thermoplastic resins and thermoplastic elastomers (TPE) having resilience similar to that of rubber, however a thermoplastic elastomer is preferably employed in consideration of the resilience required during running and formability during manufacture.

Examples of such thermoplastic elastomers include, for example, amide thermoplastic elastomers (TPA), ester thermoplastic elastomers (TPC), olefin thermoplastic elastomers (TPO), styrene thermoplastic elastomers (TPS), urethane thermoplastic elastomers (TPU), thermoplastic cross-linked rubber (TPV) or other thermoplastic elastomers (TPZ), as defined in JIS K6418.

Examples of thermoplastic resins include, for example, urethane resins, olefin resins, vinyl chloride resins and polyamide resins.

The tire halves 17A configured from the first thermoplastic material can be formed by, for example, vacuum molding, air pressure molding, injection molding or melt casting. Accordingly, the manufacturing processes can be greatly simplified in comparison to molding (vulcanizing) in rubber and a much shorter molding time is sufficient.

In the present exemplary embodiment the tire halves 17A are left-right symmetrically shaped, namely there is the advantage that since one of the tire halves 17A is formed with the same shape as the other of the tire halves 17A a single mold is sufficient for molding the tire halves 17A.

A circular ring shaped bead core 18 formed from a steel cord is embedded in each of the bead sections 12 of the present exemplary embodiment, similarly to as in an ordinary conventional pneumatic tire, however the bead core 18 may be omitted as long as sufficient rigidity of the bead sections 12 is achieved and no problems arise in fitting to the rim 20. The bead core 18 may be configured with a cord from a material other than steel, such as an organic fiber cord.

In the present exemplary embodiment the contact portion of the bead sections 12 to the rim 20, at least the portion that makes contact with the rim flange 22 of the rim 20, is formed from a circular ring shaped seal layer 24 formed from a softer material than the first thermoplastic resin, such as a resilient rubber having superior sealing ability (air sealing ability). The seal layer 24 may also be formed at the portion that makes contact with the bead seat. Preferably a similar type of rubber to that employed on the bead portion outer face of an ordinary conventional rubber pneumatic tire is used for the rubber for forming the seal layer 24. The rubber seal layer 24 may be omitted as long as sealing ability can be secured to the rim 20 by the thermoplastic resin alone. Configuration may also be made employing another type of thermoplastic resin having superior sealing ability to that of the first thermoplastic resin forming the side sections 14.

A crown reinforcement layer 28 made from spirally wound steel cord 26 is embedded in the crown section 16. Configuration may be made with the cord 26 completely embedded in the crown section 16 (note the cord 26 is not just included in the tire halves 17A but also included in a welding thermoplastic material 43, described later, of a joining section for joining together the tire halves), or configuration may be made with only part of the cord 26 embedded in the crown section 16. The crown reinforcement layer 28 corresponds to a belt disposed at the outer peripheral face of the carcass in a conventional rubber pneumatic tire. The embedding amount of the reinforcement cord 26 is preferably ⅕ or more of the diameter of the reinforcement cord 26, and more preferably more than ½. It is most preferably for the whole of the reinforcement cord 26 to be embedded in the crown section 16. When the embedded amount of the reinforcement cord 26 exceeds ½ the diameter of the reinforcement cord 26 becomes less likely to come out from the surface due to dimensionality. When the whole of the reinforcement cord 26 is buried in the crown section 16 the surface becomes flat, making it less likely that air is trapped when members are laid down above.

A tread rubber layer 30 is disposed at the outer peripheral side of the crown reinforcement layer 28, with the tread rubber layer 30 configured from a rubber with superior abrasion resistance characteristics that the first thermoplastic material forming the side sections 14. Preferably a similar type of rubber to the rubber employed in a conventional rubber pneumatic tire is employed as the rubber used in the tread rubber layer 30. Configuration may be made with a tread layer provided at an outer peripheral section and formed from another type of thermoplastic material with superior abrasion resistance characteristics to those of the first thermoplastic material forming the side sections 14.

Tire Manufacturing Apparatus

Explanation follows regarding a manufacturing apparatus for the tire 10 of the present exemplary embodiment.

Figure 2:
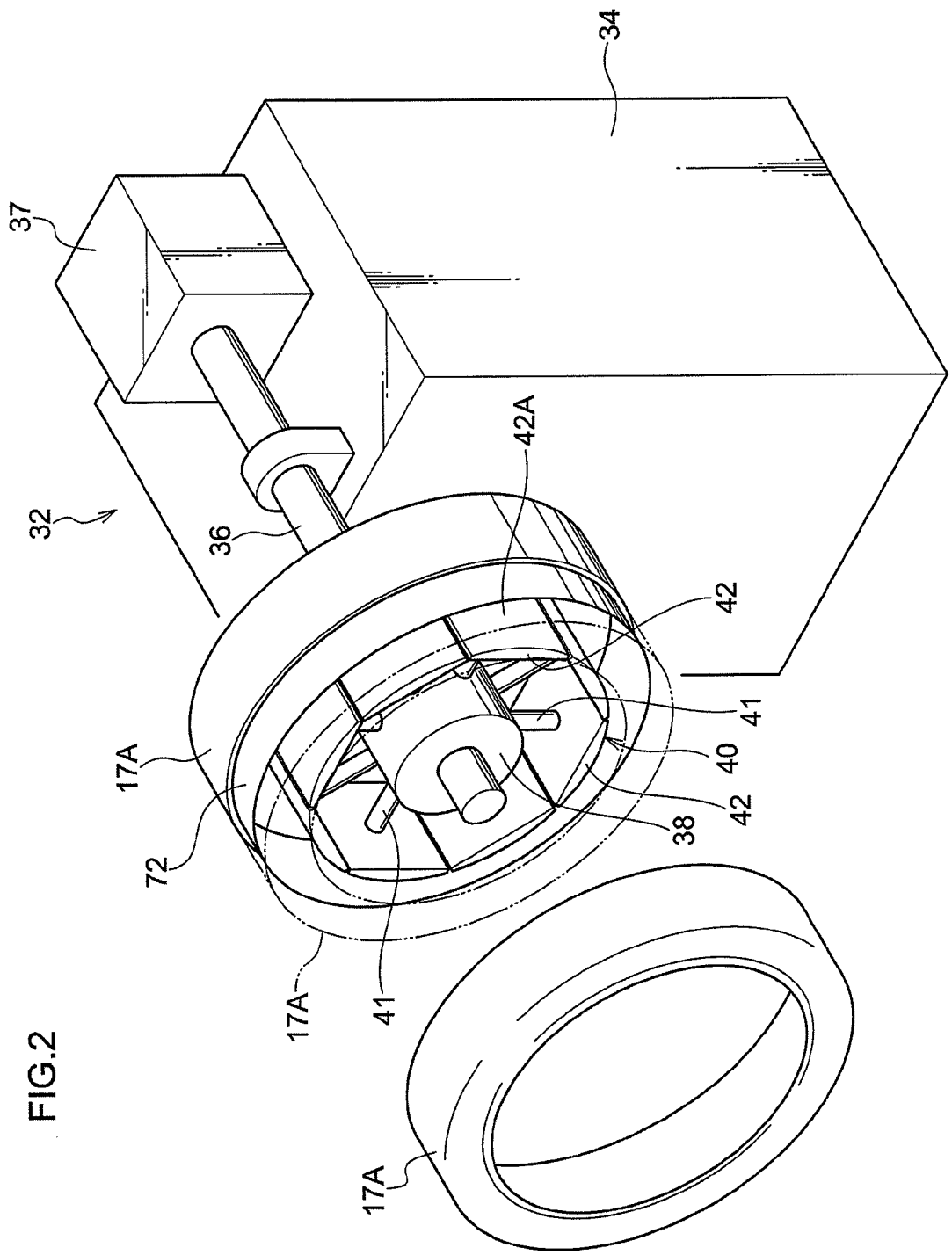
FIG. 2 is a perspective view of a tire building machine.

FIG. 2 is a perspective view of relevant portions of a building machine 32 employed when forming the tire 10. The building machine 32 has a geared motor 37 for rotating a horizontally disposed shaft 36 attached to the top of a seating block 34 placed on the floor.

A tire supporting section 40 is provided on the end side of the shaft 36. The tire supporting section 40 is equipped with a cylinder block 38 fixed to the shaft 36, and with plural cylinder rods 41 provided at even spacings around the circumferential direction of the cylinder block 38 and extending towards the radial direction outside.

Tire support plates 42 are provided at the leading ends of the cylinder rods 41. Each of the tire support plates 42 has a circular arc shaped face 42A on the outside face provided with a radius of curvature substantially that of the tire inner face.

Figure 3A:
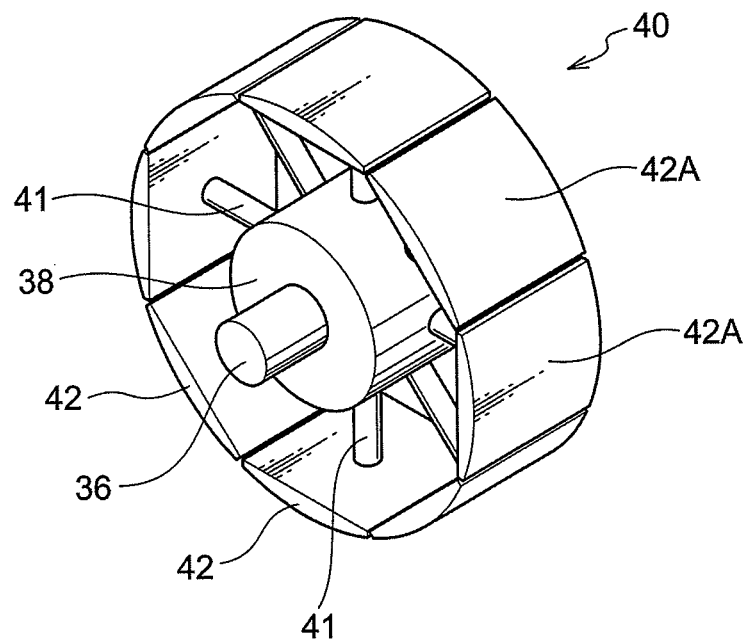
FIG. 3A is a perspective view of a tire supporting section at minimum diameter.
Figure 3B:
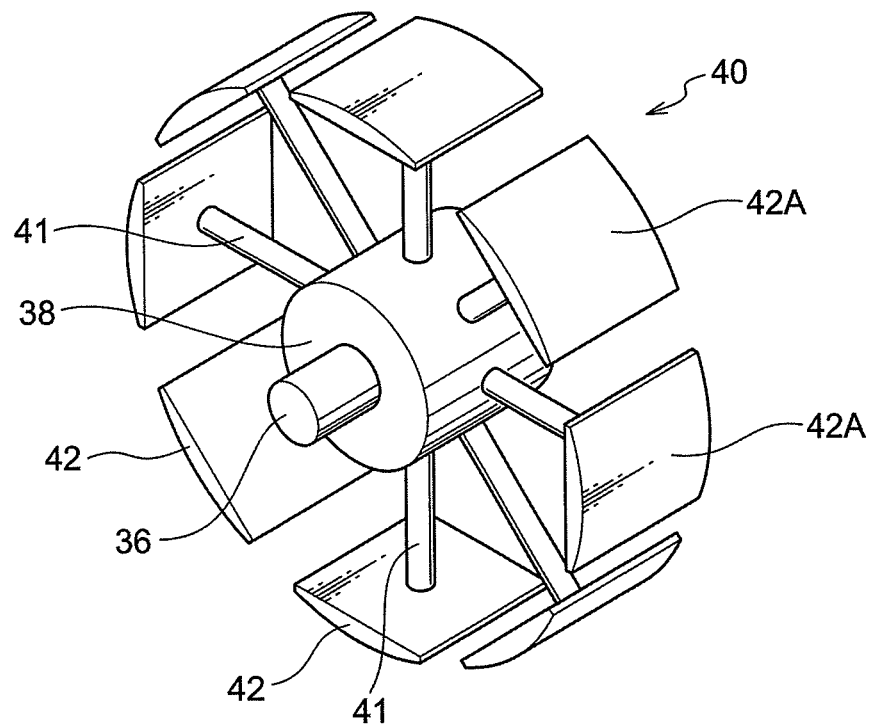
FIG. 3B is a perspective view of a tire supporting section at maximum diameter.

FIG. 2 and FIG. 3A illustrate the cylinder rods 41 in a state in which there is the minimum amount protruding (the minimum diameter state of the tire supporting section 40), and FIG. 3B illustrates the cylinder rods 41 in a state in which there is the maximum amount protruding (the maximum diameter state of the tire supporting section 40).

The cylinder rods 41 are all coupled together enabling each to be moved by the same amount in the same direction.

Figure 4:
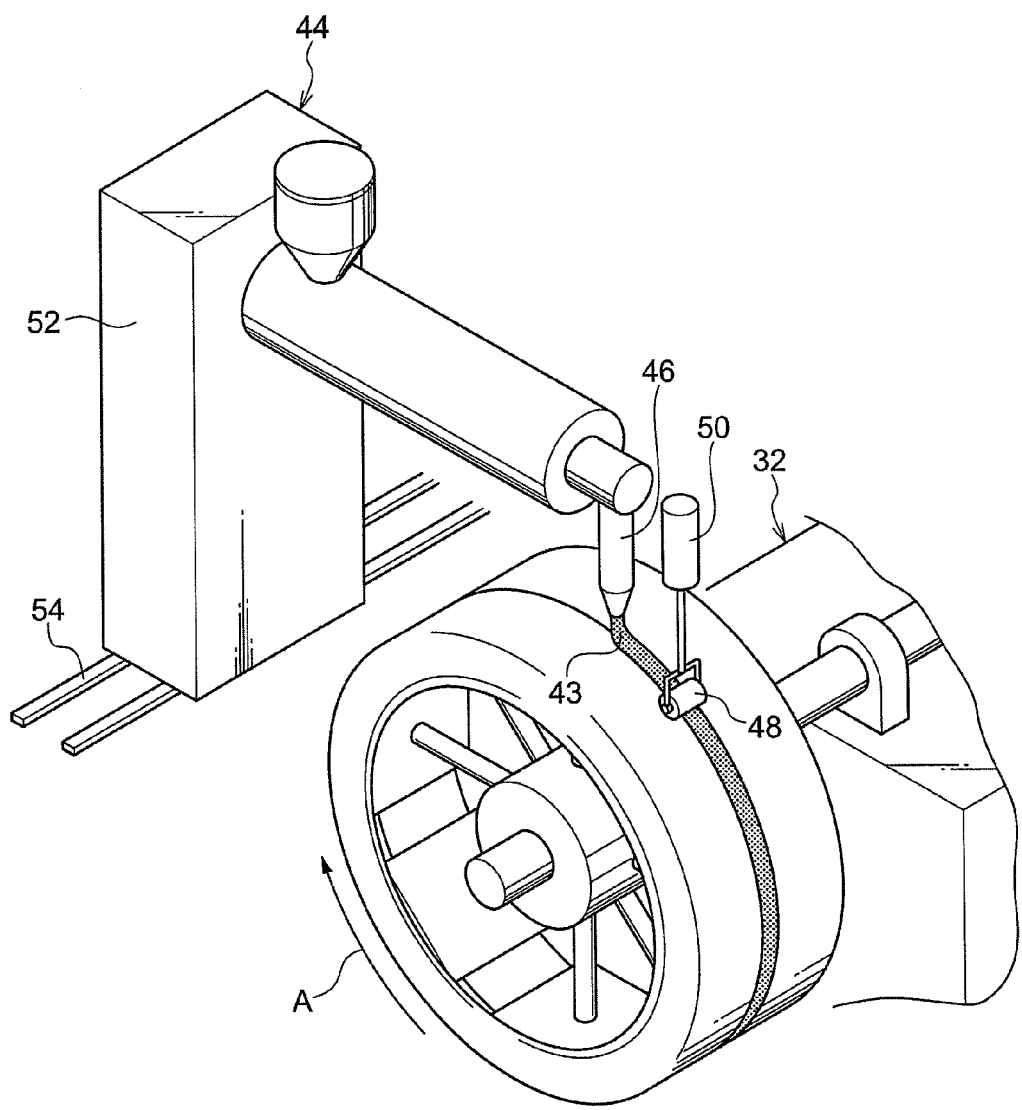
FIG. 4 is a perspective view of an extruder disposed in the vicinity of a tire building machine.

As shown in FIG. 4, an extruder 44 is disposed in the vicinity of the building machine 32 for extruding the welding thermoplastic material 43 (the second thermoplastic material of the present invention). The extruder 44 is equipped with a nozzle 46 for ejecting the molten welding thermoplastic material 43 downwards.

The welding thermoplastic material 43 is preferably the same type of material as the first thermoplastic material forming the tire case 17, however a different type of material may be employed as long as welding can be achieved.

A flatting roller 48 to press against the welding thermoplastic material 43 applied to the tire outer face, and a cylinder device 50 for moving the flatting roller 48 up or down are disposed in the vicinity of the nozzle 46. The cylinder device 50 is supported through a frame, not shown in the drawings, by a support pillar 52 of the extruder 44.

The extruder 44 is capable of moving along guide rails 54 disposed on the floor in a direction parallel to the shaft 36 of the building machine 32.

Figure 5:
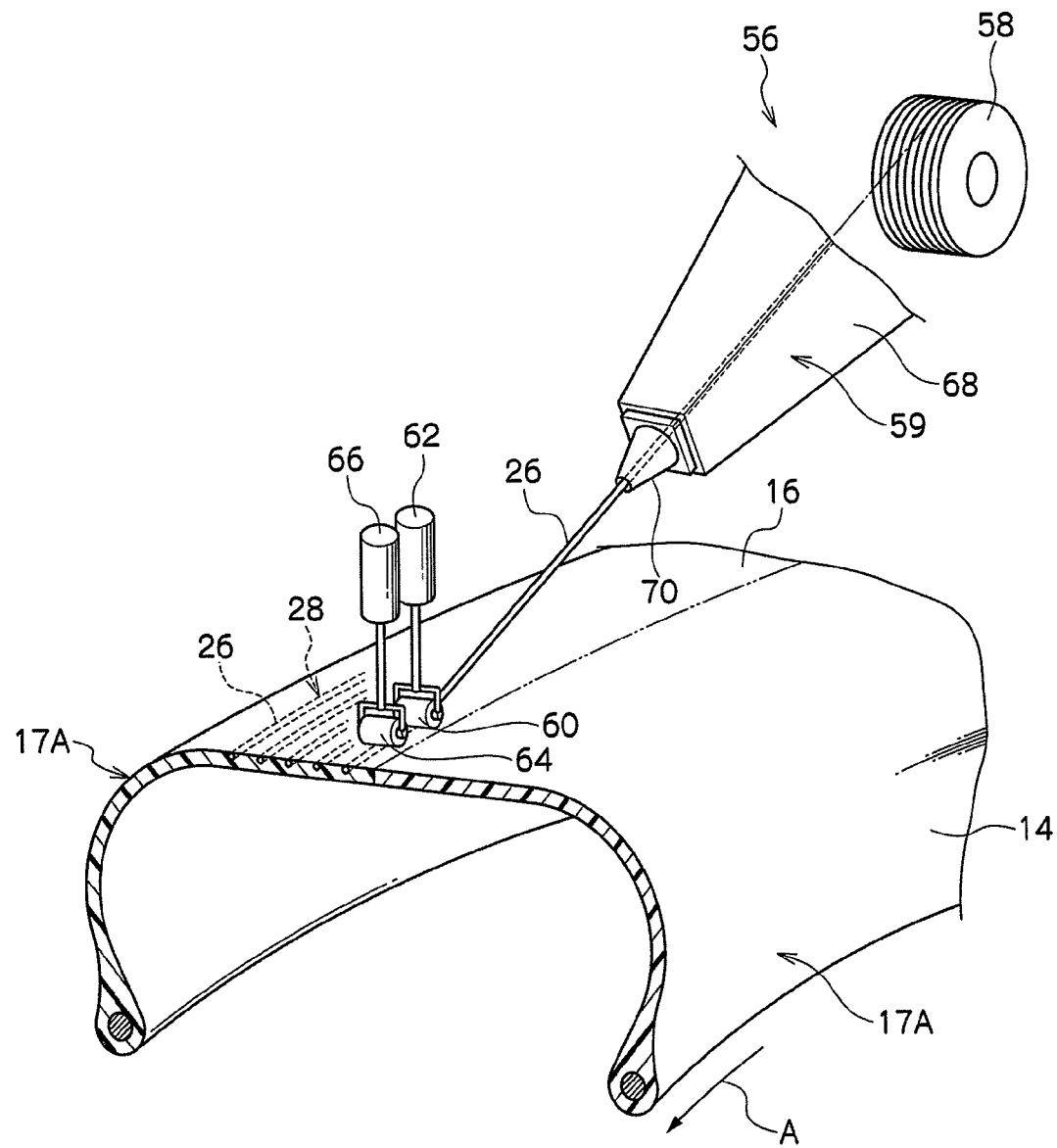
FIG. 5 is a perspective view of relevant portions of a cord feeder apparatus.

A cord feeder device 56 is movably mounted to the guide rails 54, as shown in FIG. 5. The cord feeder device 56 is equipped with a reel 58 and a cord heating device 59.

The cord feeder device 56 is equipped with: the reel 58 on which cord 26 is wound; the cord heating device 59 disposed at the cord conveying direction downstream side of the reel 58; a first roller 60 disposed at the cord 26 conveying direction downstream side; a first cylinder device 62 for moving the first roller 60 in the direction so as to make contact with or move away from the tire outer peripheral face; a second roller 64 disposed at the cord 26 downstream side of the first roller 60; and a second cylinder device 66 for moving the second roller 64 in the direction so as to make contact with or move away from the tire outer peripheral face. Note that the cord feeder device 56 may be provided with only one of the first roller 60 or the second roller 64.

The cord heating device 59 is equipped with: a heating box 68 into which hot air is supplied from a heater and fan for generating hot air, not shown in the drawings, with the cord 26 passing through the internal space of the heating box 68; and a discharge section 70 from which the heated cord 26 is discharged.

Tire Case Building Process (1) As shown in FIG. 2, first the two tire halves 17A are disposed at the outer peripheral side of the tire supporting section 40 in its compressed diameter state, aligned facing each other and abutting, and with a cylindrical shaped tire inner face support ring 72 formed from thin sheet metal (for example from sheet steel of 0.5 mm thickness) disposed at inside portions of the two tire halves 17A (note that to enable the interior to be seen one of the tire halves 17A is illustrated in a detached state in FIG. 2).

The external diameter of the tire inner face support ring 72 is set at substantially the same dimension as the inner diameter of the outer peripheral portion of the tire halves 17A, such that the outer peripheral face of the tire inner face support ring 72 is in close contact with the inner peripheral face of the outer peripheral section of the tire halves 17A.

By disposing the cylindrical shaped tire inner face support ring 72 at the inside of the two tire halves 17A, the inner face side of the joint portion between the tire halves 17A is in close contact with the outer peripheral face of the tire inner face support ring 72. Accordingly, projections and indentations in the joint portion (described later), caused by (and in a reciprocal profile to) indentations and projections occurring at the outer periphery of the tire supporting section due to gaps arising between one of tire support plates 42 of the tire supporting section 40 and another of the tire support plates 42, can be suppressed from occurring. Indentations and projections can also be suppressed from arising in the tire case 17 itself.

The tire inner face support ring 72 is easily inserted into the tire halves 17A by bending deformation due to being formed from thin sheet metal.

Figure 6:
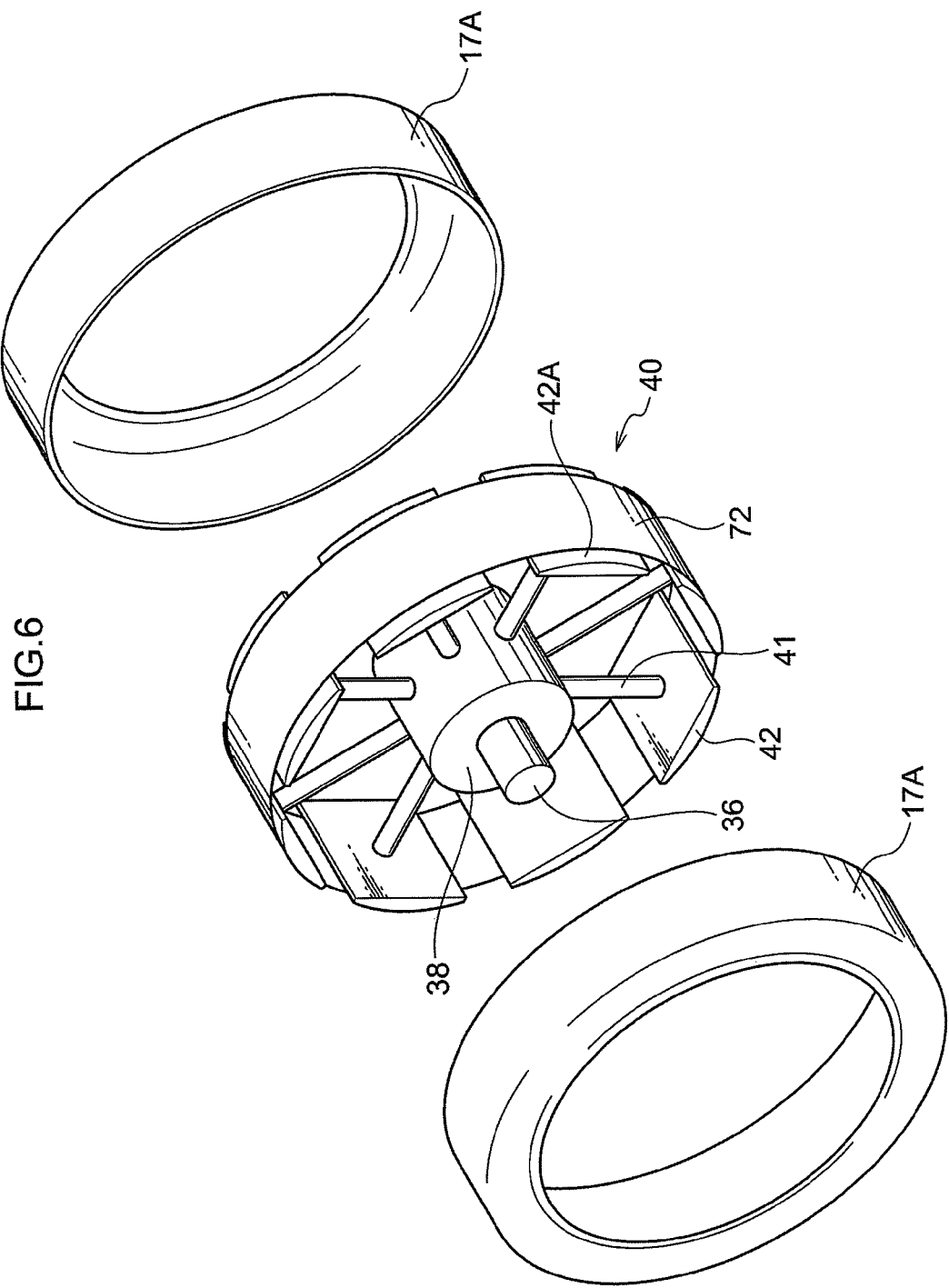
FIG. 6 is a perspective view of tire halves and a tire inner face support ring supported on a tire supporting section.

Then, as shown in FIG. 6, the tire supporting section 40 is expanded in diameter to make the plural tire support plates 42 contact the inner peripheral face of the tire inner face support ring 72, such that the inside of the tire inner face support ring 72 is held by the plural tire support plates 42 (note that to enable the interior to be seen both of the tire halves 17A are illustrated in a detached state in FIG. 6).

(2) Next the extruder 44 is moved such that, as shown in FIG. 4, the nozzle 46 is disposed above the abutting portions of the tire halves 17A. Then, while rotating the tire supporting section 40 in the direction of arrow A, the melted welding thermoplastic material 43 is extruded out from the nozzle 46 towards the joining location, applying the melted welding thermoplastic material 43 along the joining location, and the flatting roller 48 disposed at the downstream side is pressed against the welding thermoplastic material 43.

Figure 7:
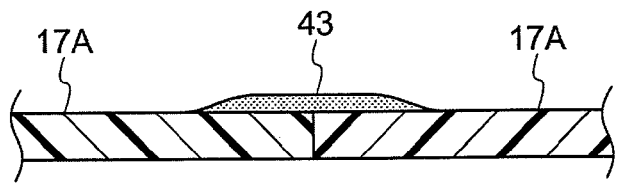
FIG. 7 is a cross-section illustrating a joint portion of tire halves in which a welding thermoplastic material is employed.
Figure 8:
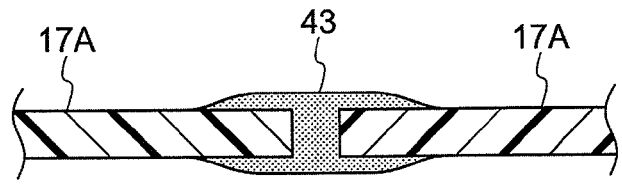
FIG. 8 is a cross-section illustrating a joint portion of tire halves in which a welding thermoplastic material is employed.
Figure 9:
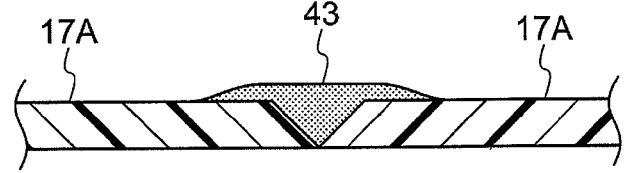
FIG. 9 is a cross-section illustrating a joint portion of tire halves in which a welding thermoplastic material is employed.
Figure 10:
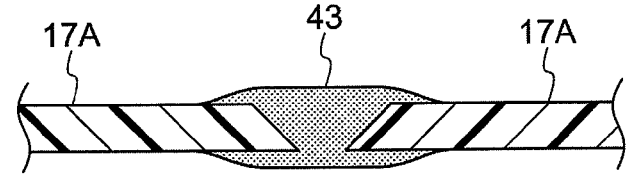
FIG. 10 is a cross-section illustrating a joint portion of tire halves in which a welding thermoplastic material is employed.

At the joint portion here between the two tire halves 17A the following methods may be employed for applying the welding thermoplastic material 43. These include: a method as shown in FIG. 7 of placing two joining faces that are parallel to the tire radial direction in contact with each other, and applying the welding thermoplastic material 43 to the outer peripheral face; a method as shown in FIG. 8 of opening a gap between two joining faces that are parallel to the tire radial direction, and applying the welding thermoplastic material 43 into the gap and to the outer peripheral face; a method as shown in FIG. 9 of providing sloping joining faces such that the separation between the joining faces gets wider on progression towards the tire outside, and applying the welding thermoplastic material 43 to the joining faces and the outer peripheral face in the state in which the edge portions of the tire halves 17A are in contact with each other; and a method as shown in FIG. 10 of providing sloping joining faces and applying the welding thermoplastic material 43 to the joining faces, the inner peripheral face and the outer peripheral face in a state in which the edge portions of the tire halves 17A are separated from each other. The melted welding thermoplastic material 43 can be forced in through the gap and around to the inside face by pressing the roller 48 firmly against the welding thermoplastic material 43 applied to the outer peripheral face.

By rotating the tire supporting section 40 in the arrow A direction while pressing the roller 48 against the welding thermoplastic material 43 the surface of the welding thermoplastic material 43 is flattened uniformly and welded to the outer peripheral face of both the tire halves 17A. The welding thermoplastic material 43 hardens with non-assisted cooling such that one of the tire halves 17A and the other of the tire halves 17A are welded together by the welding thermoplastic material 43.

Figure 11:
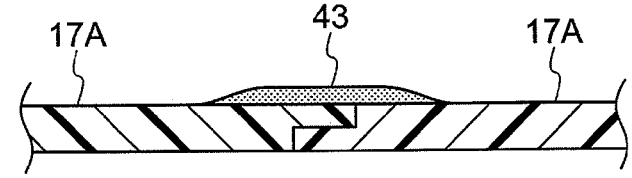
FIG. 11 is a cross-section illustrating a joint portion of tire halves in which a welding thermoplastic material is employed.
Figure 12:
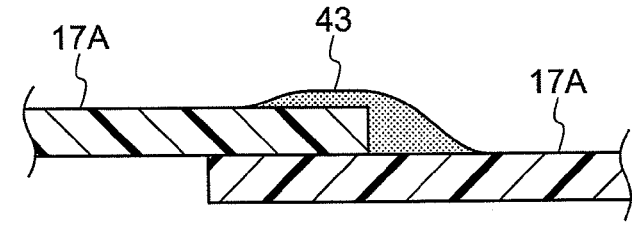
FIG. 12 is a cross-section illustrating a joint portion of tire halves in which a welding thermoplastic material is employed.

Configuration may be made such that, as shown in FIG. 11, the joint portion of the two tire halves 17A, are provided with step portions at the edge portions of the tire halves 17A, and the welding thermoplastic material 43 is applied to the outer peripheral face after the edge portions are placed in close contact with each other. Configuration may be made such that, as shown in FIG. 12, the welding thermoplastic material 43 is applied to the outer peripheral face after overlapping the tire halves 17A in the vicinity of the edge portions. Note that configuration may be made such that only the surface of the tire halves 17A at portions where the welding thermoplastic material 43 is to be applied is softened or melted in advance by hot air, infrared radiation of the like, and the welding thermoplastic material 43 applied to the softened or melted portions. The joint portions of the first thermoplastic material configuring the tire halves 17A and the welding thermoplastic material 43 are accordingly mixed well, raising join strength.

(3) The extruder 44 is then retracted and the cord feeder device 56 is disposed in the vicinity of the tire supporting section 40.

As shown in FIG. 5, the tire case 17 is rotated in the arrow A direction and the heated cord 26 discharged from the discharge section 70 of the cord feeder device 56 is wound in a spiral shape on the outer peripheral face of the tire case 17 and the welding thermoplastic material 43 at the joint portion so as to form the crown reinforcement layer 28. Configuration may be made such that the cord feeder device 56 is moved in the tire case 17 axial direction while rotation the tire case 17 in order to wind the cord 26 in a spiral shape on the outer peripheral face of the tire case 17.

By heating the cord 26 to a higher temperature than the melting point of the first thermoplastic material (for example, heating the cord 26 to a temperature from about 100 to 200° C.) portions of the first thermoplastic material and the welding thermoplastic material 43 making contact with the cord 26 are melted, and a portion or all of the cord 26 can be embedded into the outer peripheral face of the tire case 17. The cord 26 is pressed by the first roller 60 and the second roller 64 and embedded into the first thermoplastic material and the welding thermoplastic material 43 of the joint portion.

The embedded amount of the cord 26 can be adjusted with the temperature of the cord 26 and the tension applied to the cord 26. The tension applied to the cord 26 is adjustable by, for example, applying braking to the reel 58, or providing a tension adjustment roller in the conveying path of the cord 26.

(4) The pre-vulcanized strip shaped tread rubber layer 30 is then wound once around the outer peripheral face of the tire case 17 and the tread rubber layer 30 is bonded to the outer peripheral face of the tire case 17 using, for example, an adhesive. A known pre-cured tread used in recycled tires can, for example, be employed for the tread rubber layer 30. This process is similar to the process of bonding a pre-cured tread to the outer peripheral face of a tire base in recycled tire manufacturing.

(5) Bonding the seal layer 24 formed from pre-vulcanized rubber to the bead sections 12 of the tire case 17 thus completes the tire 10.

(6) Finally the diameter of the tire supporting section 40 is shrunk, the completed tire 10 is removed from the tire supporting section 40 and the tire inner face support ring 72 is removed from inside the tire by bending deformation.

Operation

In the tire 10 of the present exemplary embodiment the one tire half 17A and the other tire half 17A are welded together with the welding thermoplastic material 43. Accordingly, since the tire halves 17A are not themselves melted for bonding, deterioration of the thermoplastic material forming the tire halves 17A is suppressed, and sufficient strength of the joint portion can be secured.

In the present exemplary embodiment the one tire half 17A and the other tire half 17A of the left-right symmetrical tire 10 can be manufactured without changing the shape of the mold.

Substantially all of the tire 10 in the present exemplary embodiment except for the tread portion is formed from the first thermoplastic material, and so molding, such as by vacuum molding, air pressure molding and injection molding, can be employed, enabling the manufacturing processes to be greatly simplified in comparison to those of a rubber pneumatic tire.

In the tire 10 of the present exemplary embodiment the bead core 18 are embedded in the bead sections 12 and so a fitting strength to the rim 20 similar to that of a conventional rubber pneumatic tire can be secured.

In the tire 10 of the present exemplary embodiment, there is a high proportion of thermoplastic material making up the materials for constructing the tire, achieving good recyclability.

The crown reinforcement layer 28, configured by the spirally cord 26 of higher rigidity to that of the first thermoplastic material, is provided to the crown section 16, reinforcing the crown section 16, and raising characteristics such as the resistance to punctures, damage resistance, circumferential direction rigidity and cleaving prevention effect.

The seal layer 24 formed from a material that is softer than the first thermoplastic material is provided to the portion making contact with the rim 20, and in particular the portion making contact with the rim flange 22, and so similar sealing ability to that of a conventional rubber pneumatic tire is obtained.

Rim fit-ability is raised by providing the seal layer 24 that is both soft and has rebound resilience. A rubber material is preferably employed as the material for the seal layer 24. The tire 10 of the present exemplary embodiment employs a tread rubber layer formed from a similar type of rubber to the rubber employed in the tread of a conventional rubber pneumatic tire and so durability to wear and cleavage similar to that of a conventional rubber pneumatic tire is obtained.

The tire case 17 in the present exemplary embodiment is formed by joining together the two tire halves 17A, however when configuring with 3 members the tire case 17 can be split into 3 members that are one side section 14, another side section 14 and a substantially circular cylindrical shaped crown section 16. Joining these together can also be achieved by welding using the welding thermoplastic material 43.

Second Exemplary Embodiment

In the above exemplary embodiment the welding thermoplastic material 43 is supplied to the joint portion in a completely molten state, and one of the tire halves 17A and the other of the tire halves 17A are welded together. However in the second exemplary embodiment a strip shaped welding sheet 74 formed from a thermoplastic material (the second thermoplastic material of the present invention) is welded to both the one of the tire halves 17A and the other of the tire halves 17A, namely welded so as to straddle across the outer peripheral portion of the joining faces of the one of the tire halves 17A and the other of the tire halves 17A, thereby joining together the one of the tire halves 17A and the other of the tire halves 17A. The width of the welding sheet 74 is preferably 5 mm or greater.

Figure 13:
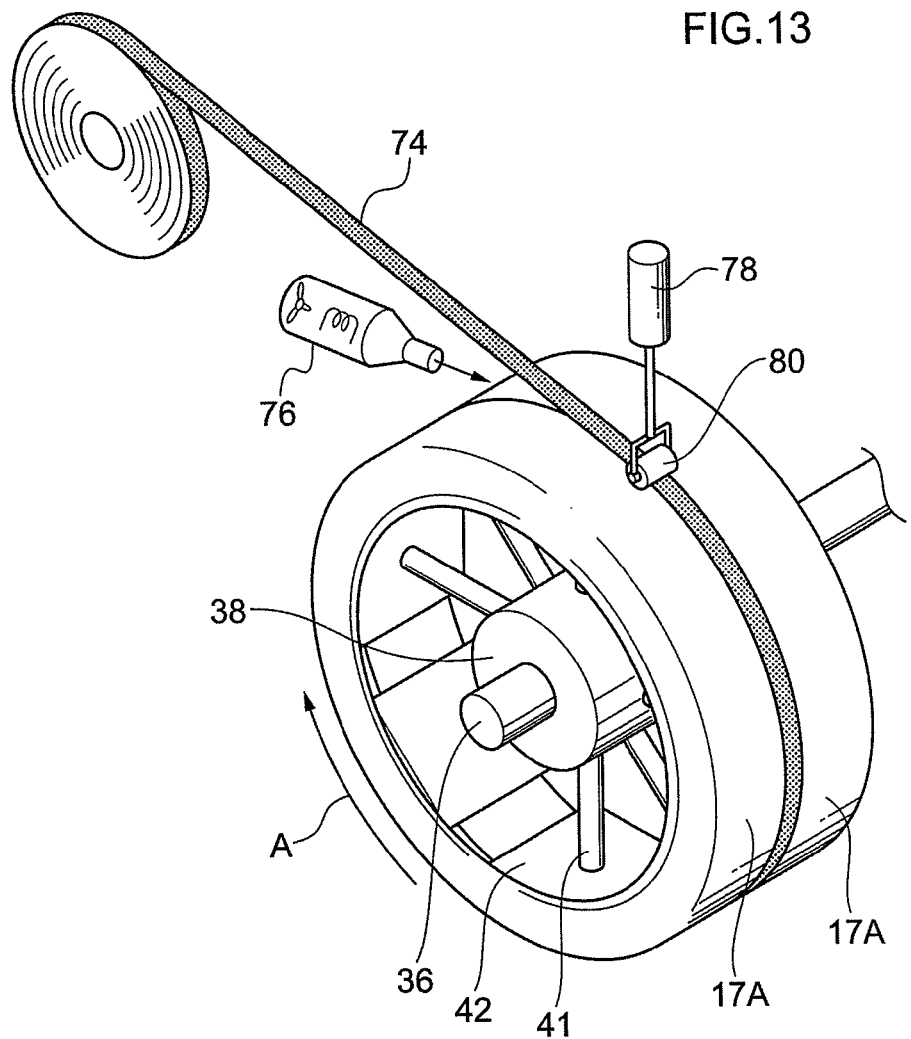
FIG. 13 is a perspective view of a tire case being welded with a welding sheet.

In the joining method of the present exemplary embodiment, as shown in FIG. 13, hot air generated by a heating device 76 configured with a heater and fan is directed against the bottom face of the welding sheet 74 (the side facing towards the tire halves 17A), the bottom surface of the welding sheet 74 is melted. The welding sheet 74 is then bonded straddling both the one of the tire halves 17A and the other of the tire halves 17A by winding the welding sheet 74 onto the tire case 17 while rotating the tire case 17 in the arrow A direction.

The welding sheet 74 is pressed against the tire halves 17A by a roller 80 biased by a cylinder 78, and bonding of the welding sheet 74 can hence be assured. Configuration may be made with heating using irradiation of infrared radiation instead of heating with hot air. As long as the thermoplastic material is softened and good joining is achieved it is not always necessary to melt the thermoplastic material.

Configuration may be made such that hot air is directed onto the bottom face of the welding sheet 74 and at the location on the outer peripheral section of the tire halves 17A where the welding sheet 74 is to be welded, and the welding sheet 74 welded to the tire halves 17A after only melting these surfaces.

The thermoplastic material employed in the welding sheet 74 is preferably the same type of thermoplastic material as that forming the tire halves 17A. However configuration may be made with a different type of thermoplastic material to that of the thermoplastic material forming the tire halves 17A as long this does not cause problems with welding.

Figure 14:
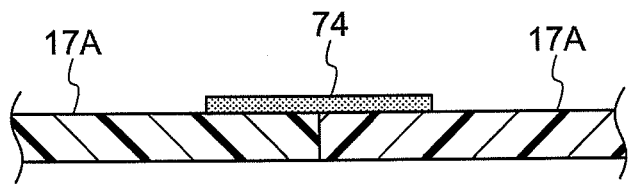
FIG. 14 is a cross-section illustrating a joint portion of tire halves in which a welding sheet is employed.
Figure 15:
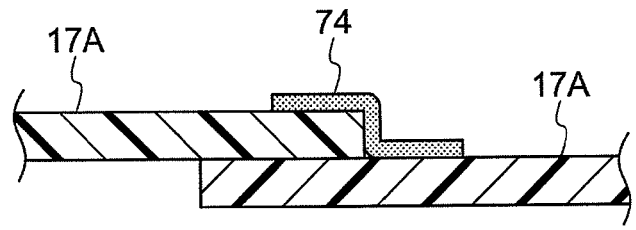
FIG. 15 is a cross-section illustrating a joint portion of tire halves in which a welding sheet is employed.
Figure 16:
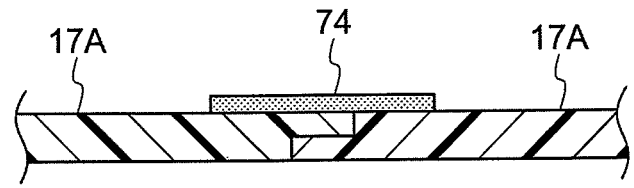
FIG. 16 is a cross-section illustrating a joint portion of tire halves in which a welding sheet is employed.
Figure 17A:
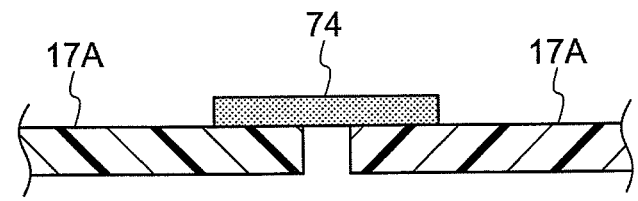
FIG. 17A is a cross-section illustrating a joint portion of tire halves in which a welding sheet is employed.
Figure 17B:
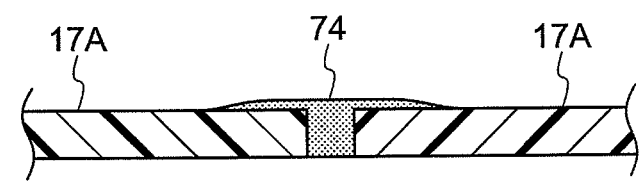
FIG. 17B is a cross-section illustrating a joint portion of tire halves in which a welding sheet is employed.

Examples of joints employing the welding sheet 74 are illustrated in FIG. 14 to FIG. 18. In the example of FIG. 14, two joining faces that are parallel to the tire radial direction are placed in contact with each other, and the welding sheet 74 is welded to the outer peripheral face. In the example of FIG. 15, the welding sheet 74 is welded to the outer peripheral face after overlapping the tire halves 17A in the vicinity of their edge portions. In the example of FIG. 16, step portions are provided to the edge portions of the tire halves 17A and the welding sheet 74 is welded to the outer peripheral face after placing the step portions in close contact with each other. In the example in FIG. 17, a gap is opened between the two joining faces that are parallel to the tire radial direction, the welding sheet 74 is stuck to the outer peripheral face, and the welding sheet 74 is pushed into the gap by pressing the roller 80 (not shown in FIG. 18) against the welding sheet 74, such that the welding sheet 74 is also bonded to the joining faces. When providing a gap between the two joining faces the width of the gap is preferably about 0.5 to 2.0 mm.

Figure 18A:
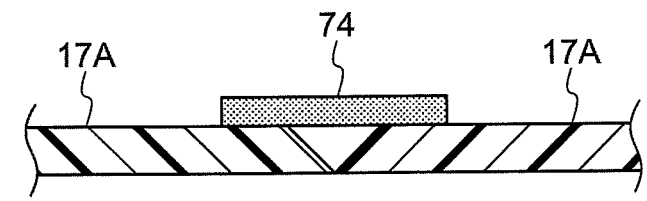
FIG. 18A is a cross-section illustrating a joint portion of tire halves in which a welding sheet is employed.
Figure 18B:
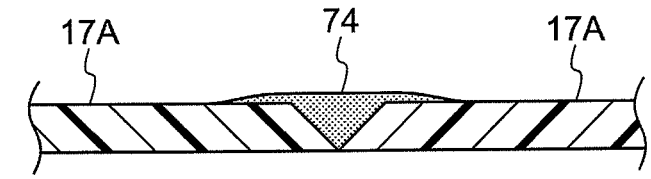
FIG. 18B is a cross-section illustrating a joint portion of tire halves in which a welding sheet is employed.
Figure 19A:
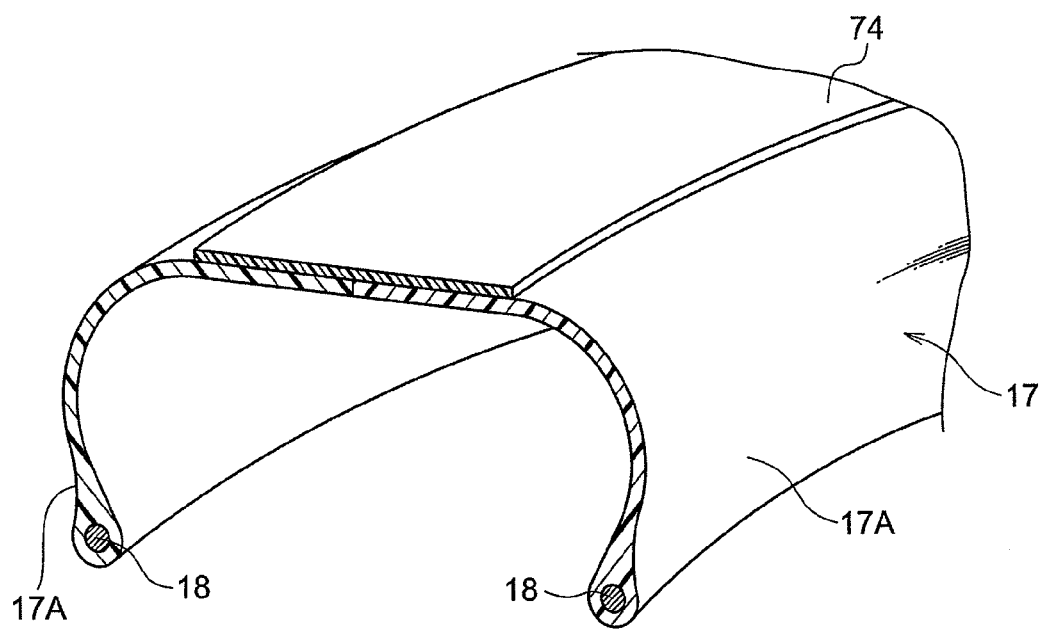
FIG. 19A is a perspective view of a tire case welded with a wide width welding sheet.
Figure 19B:
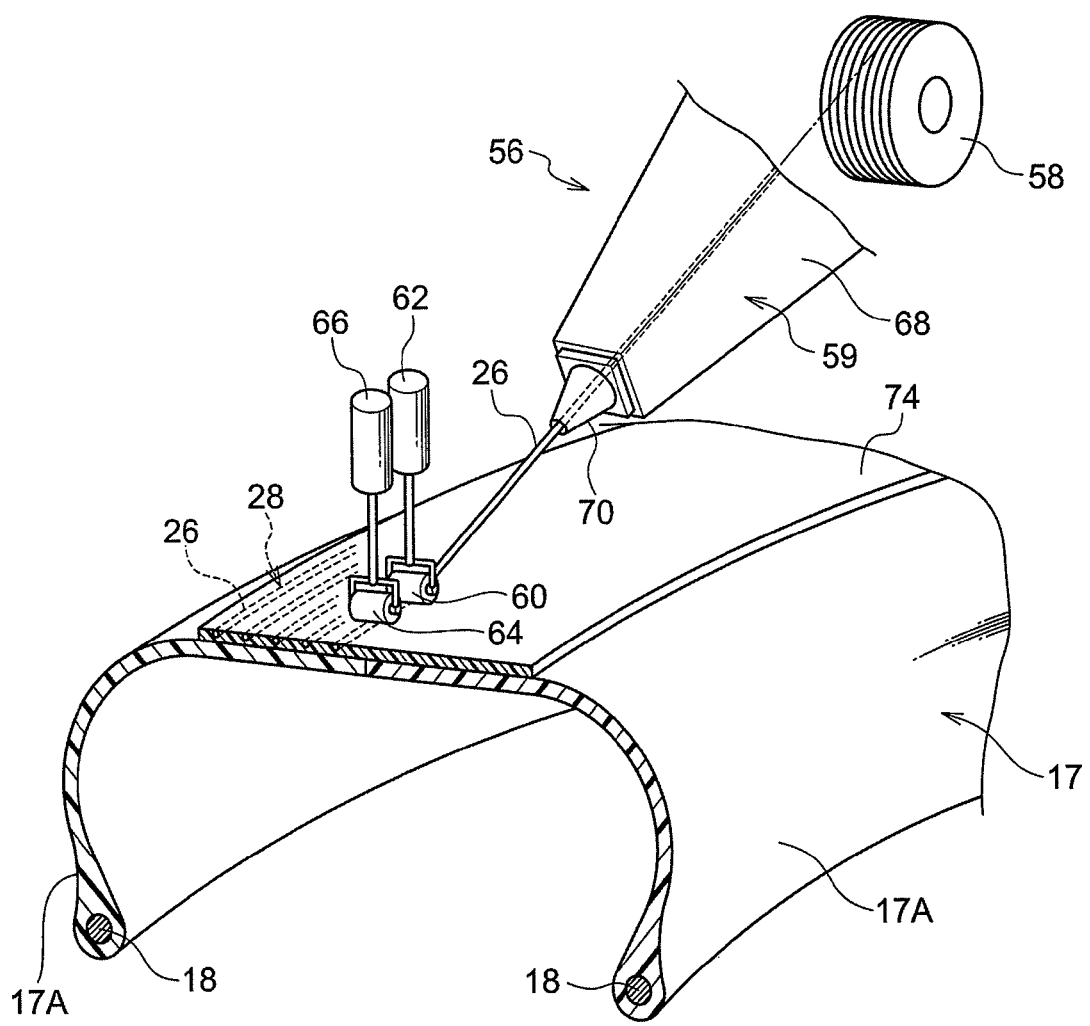
FIG. 19B is a perspective view of a tire case welded with a welding sheet and illustrating a method for embedding cord in the welding sheet.

In the example of FIG. 18, sloping joining faces are provided, the welding sheet 74 is stuck to the outer peripheral face, and the welding sheet 74 is also welded to the sloping joining faces by pressing the roller 80 (not shown in FIG. 18) against the welding sheet 74. In the example of FIG. 19, a welding sheet 74 having a width wide enough to cover substantially all of the outer peripheral face of the tire halves 17A is welded to the outer peripheral face. The cord 26 is then embedded in the welding sheet 74 using a similar method to that of the first exemplary embodiment and the crown reinforcement layer 28 is obtained.

Other Exemplary Embodiments

Figure 20:
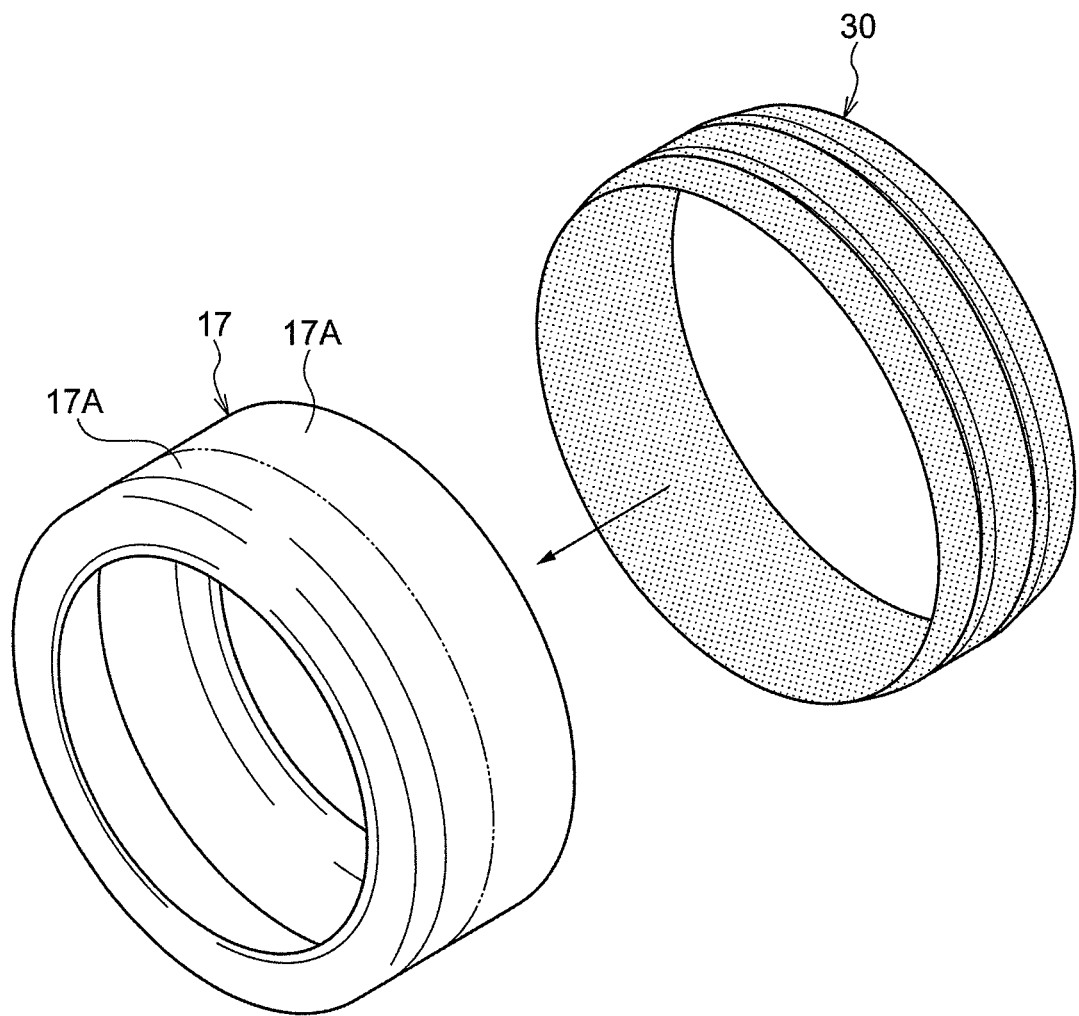
FIG. 20 is an exploded perspective view of a tire case and tread rubber layer according to another exemplary embodiment.

In the above exemplary embodiments the tread section is configured by wrapping the pre-vulcanized strip shaped tread rubber layer 30 once around the outer peripheral face of the tire case 17. However, as shown in FIG. 20, configuration may be made with a pre-vulcanized tread rubber layer 30 preformed into circular cylindrical shape, inserting the tire case 17 into the tread rubber layer 30 along the tire case 17 axial direction, and bonding together the tire case 17 and the circular cylindrical shaped pre-vulcanized tread rubber layer 30, such as with an adhesive.

In the above exemplary embodiments the material of the cord 26 is steel, however configuration may be made with organic fibers or the like. When organic fiber cord 26 is employed the cord 26 itself is not heated, and the cord 26 can be wound while heating and melting the outer surface of the outer peripheral section of the tire case 17 and/or the outer peripheral face of the welding sheet 74.

Figure 21:
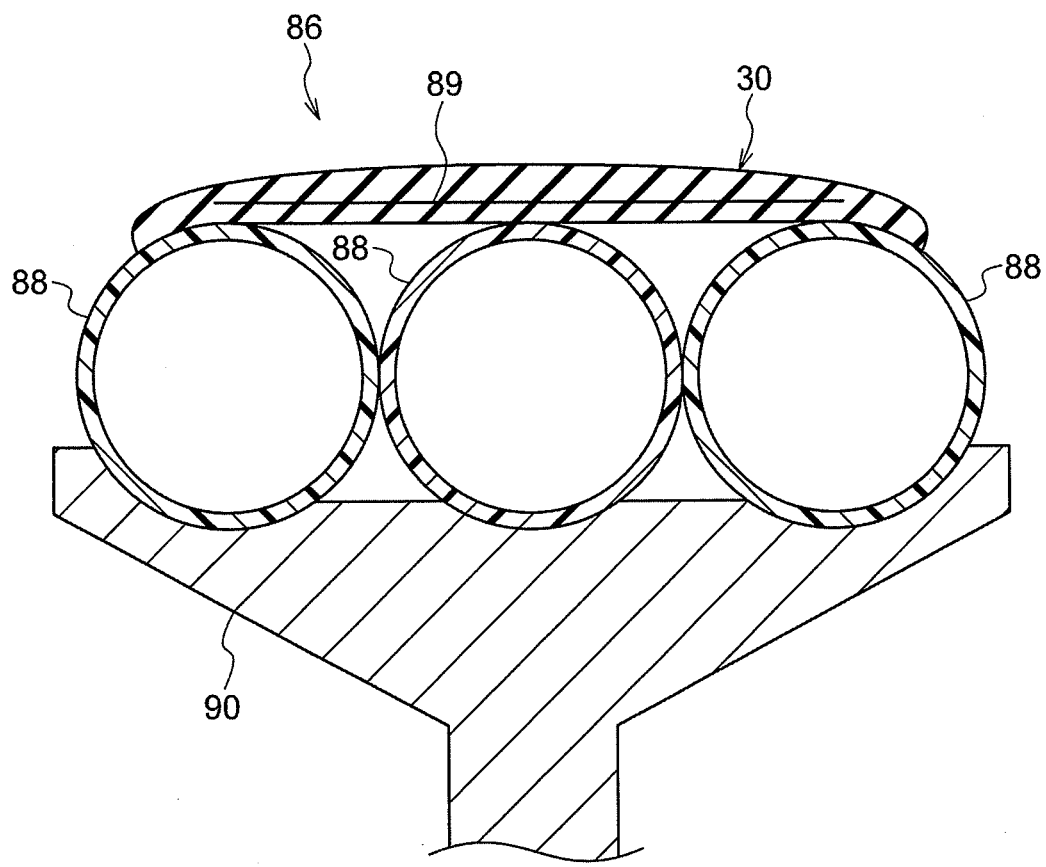
FIG. 21 is a cross-section of a tire according to another exemplary embodiment.

The tire 10 of the above exemplary embodiment is a tubeless type of tire. However, as shown in FIG. 21, a tire 86 of the present exemplary embodiment is configured of three tire width direction tubes 88 formed from the first thermoplastic material in hollow circular ring shapes, a tread rubber layer 30 embedded with a belt 89 bonded to outer peripheral portions of the tubes 88, with the tubes 88 mounted to engaging indentations provided in a rim 90. Bead cores are not provided in the tire 86.

Figure 22:
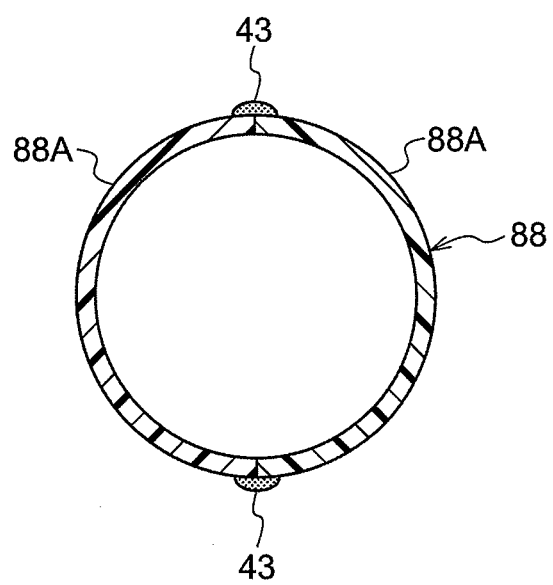
FIG. 22 is a cross-section of a tube.
Figure 23:
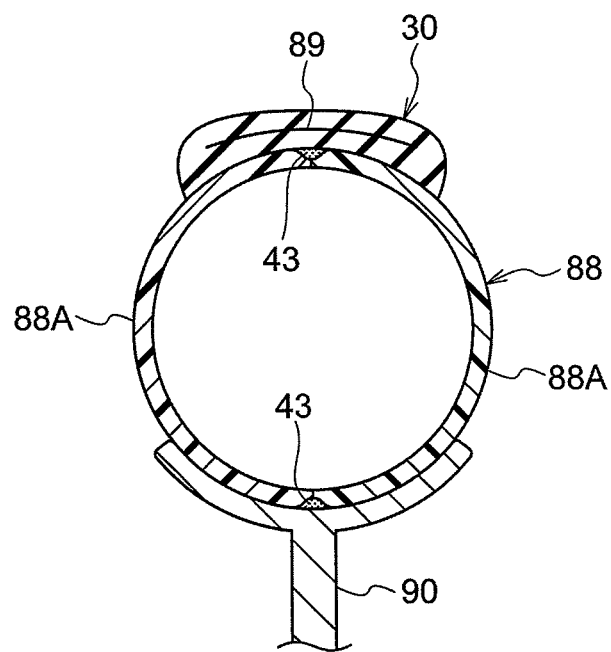
FIG. 23 is a cross-section of a tubed type tire.

The tubes 88, as shown in FIG. 22, can be formed by fitting together two semi-circular cross-section tube halves 88A and welding with the welding thermoplastic material 43, or by jointing with a welding sheet 74, not shown in the drawings. The tire 10, as shown in FIG. 23, can be configured as a tubed type of tire with a single tube 88 (formed from two tube halves 88A), and a tread rubber layer 30 bonded to the outer peripheral section of the tube 88.

The welding thermoplastic material 43 may be the same type of thermoplastic material as that of the first thermoplastic material or may be a different type of thermoplastic material to that of the first thermoplastic material as long as bonding to the first thermoplastic material configuring the tire case 17 is achieved.

The crown reinforcement layer 28 is readily manufactured by spiral winding the cord 26, however cords that are not continuous across the tire width direction may also be employed.

In the above exemplary embodiments the crown reinforcement layer 28 of the tire case 17 is formed by spiral winding the heated cord 26 on the outer peripheral face of the tire case 17. However, the tire case 17 equipped with the crown reinforcement layer 28 can be obtained by disposing the cord 26 in a spiral shape inside a mold for molding the tire case 17, then supplying molten first thermoplastic material into the mold.

The invention claimed is:
1. A tire configured with a plurality of tire frame members formed from a thermoplastic material, wherein mutually adjacent ones of the tire frame members are joined by a thermoplastic material body separate from the tire frame members, wherein
   a crown reinforcement layer is at least partly embedded in
     an outer periphery face of the tire frame members that are joined by the thermoplastic material body, the crown reinforcement layer being formed with a spirally wound cord, the tire frame members are joined at edge portions by the thermoplastic material that is separate to the thermoplastic material that forms the tire frame members, and further comprising a rubber tread layer, which is separate from the tire frame members, and disposed outwardly of the tire frame members, the rubber tread layer having superior abrasion resistance compared to that of the thermoplastic material forming the tire frame members, wherein the rubber tread layer is disposed on an outer periphery face of the crown reinforcement layer, wherein tension acts on the spirally wound cord and the spirally wound cord applies load to the tire frame members in an inner direction of a tire radial direction, wherein rigidity of the spirally wound cord is higher than that of the thermoplastic material configuring the tire frame members, and wherein the plurality of tire frame members comprise a pair of first tire frame members configuring two side sections, and a second tire frame member disposed between the pair of first tire frame members and forming a road-surface-facing outer peripheral section.

2. The tire of claim 1 further comprising a bead section that, at the tire radial direction inside, makes contact with a bead seat and a rim flange on a rim, wherein a ring shaped bead core formed from a metal material is embedded in the bead section.

3. The tire of claim 1, wherein the thermoplastic material configures the tire from a side section to an outer peripheral section.

4. The tire of claim 1 further comprising a seal portion provided at a portion making rim contact and formed from a material that is softer than the thermoplastic material configuring the tire frame members, such that air inside the tire does not leak outside.

5. The tire of claim 1 wherein the tread layer is provided at a portion making road surface contact, and wherein the tread layer is formed from rubber with superior abrasion resistance compared with the thermoplastic material configuring the tire frame members.

6. The tire of claim 1 wherein mutually adjacent joining faces of one of the tire frame members and another of the tire frame members slope such that a separation between the joining faces widens on progression towards the tire outside, and at least the joining faces are joined together by employing a thermoplastic material body separate from the tire frame members.

7. A tire manufacturing method for manufacturing a tire comprising:

a plurality of tire frame members formed from a thermoplastic material, wherein mutually adjacent ones of the tire frame members are joined by a thermoplastic material body separate from the tire frame members; and a rubber tread layer, which is separate from the tire frame members, and disposed outwardly of the tire frame members, the rubber tread layer having superior abrasion resistance compared to that of the thermoplastic material forming the tire frame members, the method comprising:

at least partly embedding a crown reinforcement layer in an outer periphery face of the tire frame members that are joined by the thermoplastic material body, the crown reinforcement layer being formed with a spirally wound cord, joining the tire frame members at edge portions by the thermoplastic material that is separate to the thermoplastic material that forms the tire frame members, and providing the rubber tread layer on an outer periphery face of the crown reinforcement layer, wherein tension acts on the spirally wound cord and the spirally wound cord applies load to the tire frame members in an inner direction of a tire radial direction, wherein rigidity of the spirally wound cord is higher than that of the thermoplastic material configuring the tire frame members, and wherein the plurality of tire frame members comprise a pair of first tire frame members configuring two side sections, and a second tire frame member disposed between the pair of first tire frame members and forming a road-surface-facing outer peripheral section.

* * * * *